United States Patent
Benhase et al.

(10) Patent No.: US 8,631,190 B2
(45) Date of Patent: *Jan. 14, 2014

(54) PREFETCHING DATA TRACKS AND PARITY DATA TO USE FOR DESTAGING UPDATED TRACKS

(75) Inventors: Michael T. Benhase, Tucson, AZ (US); Binny S. Gill, Westford, MA (US); Lokesh M. Gupta, Tucson, AZ (US); James L. Hafner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 13/189,285

(22) Filed: Jul. 22, 2011

(65) Prior Publication Data

US 2013/0024613 A1 Jan. 24, 2013

(51) Int. Cl.
*G06F 13/10* (2006.01)
(52) U.S. Cl.
USPC .......................................... 711/103
(58) Field of Classification Search
None
See application file for complete search history.

(56) References Cited

U.S. PATENT DOCUMENTS

| | | | |
|---|---|---|---|
| 6,381,677 B1 * | 4/2002 | Beardsley et al. ............ | 711/137 |
| 6,611,901 B1 | 8/2003 | Micka et al. | |
| 2002/0178331 A1 | 11/2002 | Beardsley et al. | |
| 2006/0069871 A1 * | 3/2006 | Gill et al. ...................... | 711/118 |
| 2006/0090036 A1 | 4/2006 | Zohar et al. | |
| 2010/0017591 A1 | 1/2010 | Smith et al. | |
| 2011/0320687 A1 | 12/2011 | Belluomini et al. | |
| 2013/0024625 A1 | 1/2013 | Benhase et al. | |

FOREIGN PATENT DOCUMENTS

CN 101833422 9/2010

OTHER PUBLICATIONS

U.S. Appl. No. Unknown, entitled "Prefetching Tracks Using Multiple Caches", by inventors M. T. Benhase, B. Gill; L. Gupta, and J. Hafner.

U.S. Appl. No. Unknown, entitled "Prefetching Source Tracks for Destaging Updated Tracks in a Copy Relationship", by inventors M.T. Benhase, and L. Gupta.

Information Technology Industry Council, "Information Technology—SCSI Block Commands—3 (SBC-3)", © 2004 ITI, American National Standard, Working Draft, Project T10/xxxx-D, Reference No. ISO/IEC 14776-xxx:200x ANSI INCITS.:200x, Sep. 9, 2005, Total 146 pp.

(Continued)

*Primary Examiner* — Duc Doan
(74) *Attorney, Agent, or Firm* — David W. Victor; Konrad Raynes Davda & Victor LLP (57) ABSTRACT

Provided are a computer program product, system, and method for prefetching data tracks and parity data to use for destaging updated tracks. A write request is received including at least one updated track to the group of tracks. The at least one updated track is stored in a first cache device. A prefetch request is sent to the at least one sequential access storage device to prefetch tracks in the group of tracks to a second cache device. A read request is generated to read the prefetch tracks following the sending of the prefetch request. The read prefetch tracks returned to the read request from the second cache device are stored in the first cache device. New parity data is calculated from the at least one updated track and the read prefetch tracks.

28 Claims, 8 Drawing Sheets

(56) References Cited

OTHER PUBLICATIONS

Wikipedia, "Standard RAID Levels", [online], [Retrieved on Jun. 16, 2011]. Retrieved from the Internet at <URL: http://en.wikipedia.org/w/index.php?title=Standard_RAID_levels&printa . . . >, Total 13 pp.

Preliminary Amendment for U.S. Appl. No. 13/458,791, dated Apr. 27, 2012, 6 pp.

U.S. Appl. No. 13/458,791, filed Apr. 27, 2012, entitled "Prefetching Data Tracks and Parity Data to Use for Destaging Updated Tracks", invented by M.T. Benhase et al., 35 pp.

PCT Search Report and Written Opinion dated Nov. 15, 2012 for Serial No. PCT/IB2012/053351 filed Jul. 2, 2012.

Preliminary Amend dated May 24, 2012, pp. 1-10, for U.S. Appl. No. 13/189,271, filed Jul. 22, 2011, by inventors M.T. Benhase, B. Gill; L. Gupta, and J. Hafner.

Preliminary Amend dated May 24, 2012, pp. 1-7, for U.S. Appl. No. 13/480,255, by inventors M.T. Benhase, B. Gill; L. Gupta, and J. Hafner.

Preliminary Amend dated May 1, 2012, pp. 1-9, for U.S. Appl. No. 13/189,329, filed May 1, 2012, by inventors M.T. Benhase, and L. Gupta.

U.S. Appl. No. 13/461,485, filed May 1, 2012, by inventors M.T. Benhase, and L. Gupta.

Preliminary Amend dated May 1, 2012, pp. 1-6, for U.S. Appl. No. 13/461,485, filed May 1, 2012, by inventors M.T. Benhase, and L. Gupta.

English translation of CN101833422 filed Sep. 15, 2010.

U.S. Appl. No. 13/480,255, by inventors M.T. Benhase, B. Gill; L. Gupta, and J. Hafner.

NOA dated Apr. 23, 2013, pp. 1-21, for U.S. Appl. No. 13/189,271, filed Jul. 22, 2011, by inventors M.T. Benhase, et al.

NOA dated Jun. 14, 2013, pp. 16, for U.S. Appl. No. 13/189,271, filed Jul. 22, 2011, by inventors M.T. Benhase, et al.

NOA dated Jun. 13, 2013, pp. 24, for U.S. Appl. No. 13/189,329, filed Jul. 22, 2011, by inventors M.T. Benhase, et al.

U.S. Appl. No. 13/189,271, filed Jul. 22, 2011, entitled "Prefetching Tracks Using Multiple Caches", by inventors M.T. Benhase, B. Gill; L. Gupta, and J. Hafner.

U.S. Appl. No. 13/181,329, filed Jul. 22, 2011, entitled "Prefetching Source Tracks for Destaging Updated Tracks in a Copy Relationship", by inventors M.T. Benhase, and L. Gupta.

Information Technology Industry Council, "Information Technology—SCSI Block Commands—3 (SBC-3)", © 2004 ITI, American National Standard, Working Draft, Project T10/xxxx-D, Reference No. ISO/IEC 14776-xxx:200x ANSI INCITS.***:200x, Sep. 9, 2005, Total 146 pp.

Wikipedia, "Standard RAID Levels", [online], [Retrieved on Jun. 16, 2011]. Retrieved from the Internet at <URL: http://en.wikipedia.org/w/index.php?title=Standard_RAID_levels&printa . . . >, Total 13 pp.

Notice of Allowance dated Oct. 2, 2013, pp. 28, for U.S. Appl. No. 13/461,485, filed May 1, 2012, by inventors M.T. Benhase, and L. Gupta.

* cited by examiner

First Cache Control Block

FIG. 5

Second Cache Control Block

FIG. 6

Non-Volatile Storage Control Block

FIG. 7

Spatial Index Entry

Storage System RAID Configuration

FIG. 10

Prefetch Request

PREFETCHING DATA TRACKS AND PARITY DATA TO USE FOR DESTAGING UPDATED TRACKS

BACKGROUND OF THE INVENTION

1. Field of the Invention

The present invention relates to a computer program product, system, and method for prefetching data tracks and parity data to use for destaging updated tracks.

2. Description of the Related Art

In a Redundant Array of Independent Disk (RAID) storage system, data from a file is stored in tracks distributed across different disk drives. A stride comprises the tracks and parity data calculated from the tracks that are striped across the disk drives. A RAID controller stripes the tracks across the disks configured as RAID devices and, while writing the tracks to the disks, calculates a parity, or checksum, value that is written to one or more of the disks. The parity data may be striped or interleaved through the user data on the multiple disks. With parity, if one or more disks fail, the data on the failed disk(s) may be recovered using an algorithm that combines the parity data and the data on the surviving disks to rebuild the data on the failed disk(s).

When a storage controller receives a write to one on or more tracks in a RAID stride, the updated track is stored in a cache until a decision is made to destage the updated track to the one or more storage devices across which the stride is striped. If less than all the tracks in the stride including the updated track are maintained in cache, then the RAID controller needs to read the old tracks, other than the updated track, and old parity data in order to rewrite the entire stride including the updated track to the disks and calculate the new parity to write as the data tracks are being written. Thus, when the storage controller is ready to destage it needs to perform additional reads and cannot perform the destage operation until the required old tracks and old parity are read. The RAID controller must read the old data tracks and the old parity data, then compare the old tracks with the updated track, update the parity data, and then write the entire stride and data back to the disk drives.

SUMMARY

Provided are a computer program product, system, and method for prefetching data tracks and parity data to use for destaging updated tracks. A write request is received including at least one updated track to the group of tracks. The at least one updated track is stored in a first cache device. A prefetch request is sent to the at least one sequential access storage device to prefetch tracks in the group of tracks to a second cache device. A read request is generated to read the prefetch tracks following the sending of the prefetch request. The read prefetch tracks returned to the read request from the second cache device are stored in the first cache device. New parity data is calculated from the at least one updated track and the read prefetch tracks.

DETAILED DESCRIPTION

Figure 1:
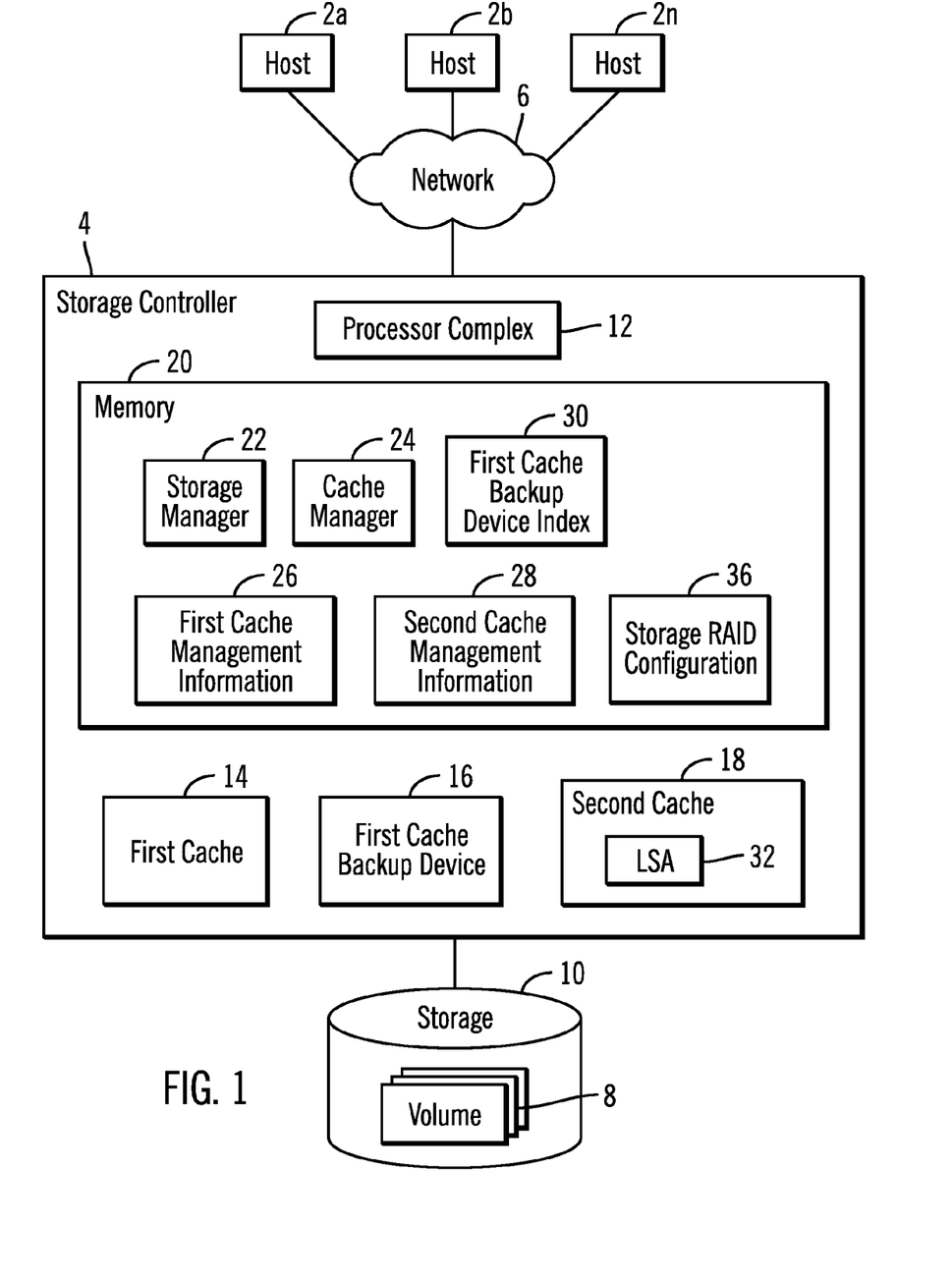
FIG. 1 illustrates an embodiment of a computing environment.

FIG. 1 illustrates an embodiment of a computing environment. A plurality of hosts 2a, 2b . . . 2n may submit Input/Output (I/O) requests to a storage controller 4 over a network 6 to access data at volumes 8 (e.g., Logical Unit Numbers, Logical Devices, Logical Subsystems, etc.) in a storage 10. The storage controller 4 includes a processor complex 12, including one or more processors with single or multiple cores, a first cache 14, a first cache backup device 16, to backup tracks in the cache 14, and a second cache 18. The first 14 and second 18 caches cache data transferred between the hosts 2a, 2b . . . 2n and the storage 10. The first cache backup device 16 may provide non-volatile storage of tracks in the first cache 14. In a further embodiment, the first cache backup device 16 may be located in a cluster or hardware on a different power boundary than that of the first cache 14.

The storage controller 4 has a memory 20 that includes a storage manager 22 for managing the transfer of tracks transferred between the hosts 2a, 2b . . . 2n and the storage 10 and a cache manager 24 that manages data transferred between the hosts 2a, 2b . . . 2n and the storage 10 in the first cache 14, first cache backup device 16, and the second cache 18. A track may comprise any unit of data configured in the storage 10, such as a track, Logical Block Address (LBA), etc., which is part of a larger grouping of tracks, such as a volume, logical device, etc. The cache manager 24 maintains first cache management information 26 and second cache management information 28 to manage read (unmodified) and write (modified) tracks in the first cache 14 and the second cache 18. A first cache backup device index 30 provides an index of track identifiers to a location in the first cache backup device 16.

The storage manager 22 and cache manager 24 are shown in FIG. 1 as program code loaded into the memory 20 and executed by the processor complex 12. Alternatively, some or all of the functions may be implemented in hardware devices in the storage controller 4, such as in Application Specific Integrated Circuits (ASICs).

The second cache 18 may store tracks in a log structured array (LSA) 32, where tracks are written in a sequential order as received, thus providing a temporal ordering of the tracks written to the second cache 18. In a LSA, later versions of tracks already present in the LSA are written at the end of the LSA 32. In alternative embodiments, the second cache 18 may store data in formats other than in an LSA.

The memory 20 further includes storage RAID configuration information 36 providing information on a RAID configuration for the storage 10 used by the storage manager 22 to determine how to form strides to write to the storage system 10, where the tracks in the strides are striped across the storage drives in the storage system 10. In such RAID embodiments, the storage manager 22 may implement RAID controller operations.

In one embodiment, the first cache 14 may comprise a Random Access Memory (RAM), such as a Dynamic Random Access Memory (DRAM), and the second cache 18 may comprise a flash memory, such as a solid state device, and the storage 10 is comprised of one or more sequential access storage devices, such as hard disk drives and magnetic tape. The storage 10 may comprise a single sequential access storage device or may comprise an array of storage devices, such as a Just a Bunch of Disks (JBOD), Direct Access Storage Device (DASD), Redundant Array of Independent Disks (RAID) array, virtualization device, etc. In one embodiment, the first cache 14 is a faster access device than the second cache 18, and the second cache 18 is a faster access device than the storage 10. Further, the first cache 14 may have a greater cost per unit of storage than the second cache 18 and the second cache 18 may have a greater cost per unit of storage than storage devices in the storage 10.

The first cache 14 may be part of the memory 20 or implemented in a separate memory device, such as a DRAM. In one embodiment, the first cache backup device 16 may comprise a non-volatile backup storage (NVS), such as a non-volatile memory, e.g., battery backed-up Random Access Memory (RAM), static RAM (SRAM), etc.

The network 6 may comprise a Storage Area Network (SAN), a Local Area Network (LAN), a Wide Area Network (WAN), the Internet, and Intranet, etc.

Figure 2:
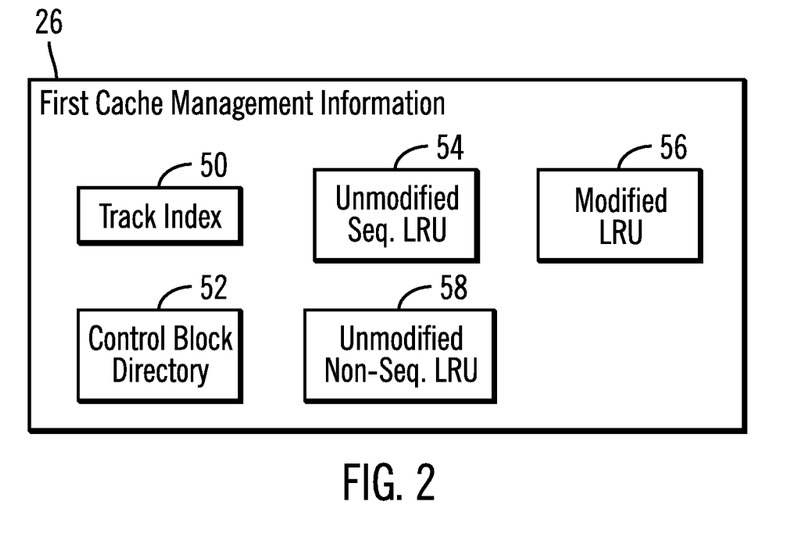
FIG. 2 illustrates an embodiment of first cache management information.

FIG. 2 illustrates an embodiment of the first cache management information 26 including a track index 50 providing an index of tracks in the first cache 14 to control blocks in a control block directory 52; an unmodified sequential LRU list 54 providing a temporal ordering of unmodified sequential tracks in the first cache 14; a modified LRU list 56 providing a temporal ordering of modified sequential and non-sequential tracks in the first cache 14; and an unmodified non-sequential LRU list 58 providing a temporal ordering of unmodified non-sequential tracks in the first cache 14.

In certain embodiments, upon determining that the first cache backup device 16 is full, the modified LRU list 56 is used to destage modified tracks from the first cache 14 so that the copy of those tracks in the first cache backup device 16 may be discarded to make room in the first cache backup device 16 for new modified tracks.

Figure 3:
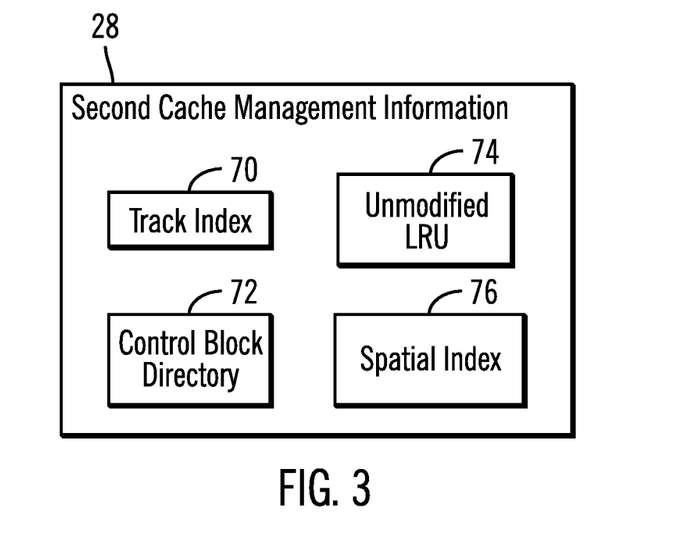
FIG. 3 illustrates an embodiment of second cache management information.

FIG. 3 illustrates an embodiment of the second cache management information 28 including a track index 70 providing an index of tracks in the second cache 18 to control blocks in a control block directory 72; an unmodified list 74 providing a temporal ordering of unmodified tracks in the second cache 18; and a spatial index 76 providing a spatial ordering of the modified tracks in the second cache 18 based on the physical locations in the storage 10 at which the modified tracks are stored.

All the LRU lists 54, 56, 58, and 74 may include the track IDs of tracks in the first cache 14 and the second cache 18 ordered according to when the identified track was last accessed. The LRU lists 54, 56, 58, and 74 have a most recently used (MRU) end indicating a most recently accessed track and a LRU end indicating a least recently used or accessed track. The track IDs of tracks added to the caches 14 and 18 are added to the MRU end of the LRU list and tracks demoted from the caches 14 and 18 are accessed from the LRU end. The track indexes 50 and 70 and spatial index 76 may comprise a scatter index table (SIT). Alternative type data structures may be used to provide the temporal ordering of tracks in the caches 14 and 18 and spatial ordering of tracks in the second cache 18.

Non-sequential tracks may comprise Online Line Transaction Processing (OLTP) tracks, which often comprise small block writes that are not fully random and have some locality of reference, i.e., have a probability of being repeatedly accessed.

Figure 4:
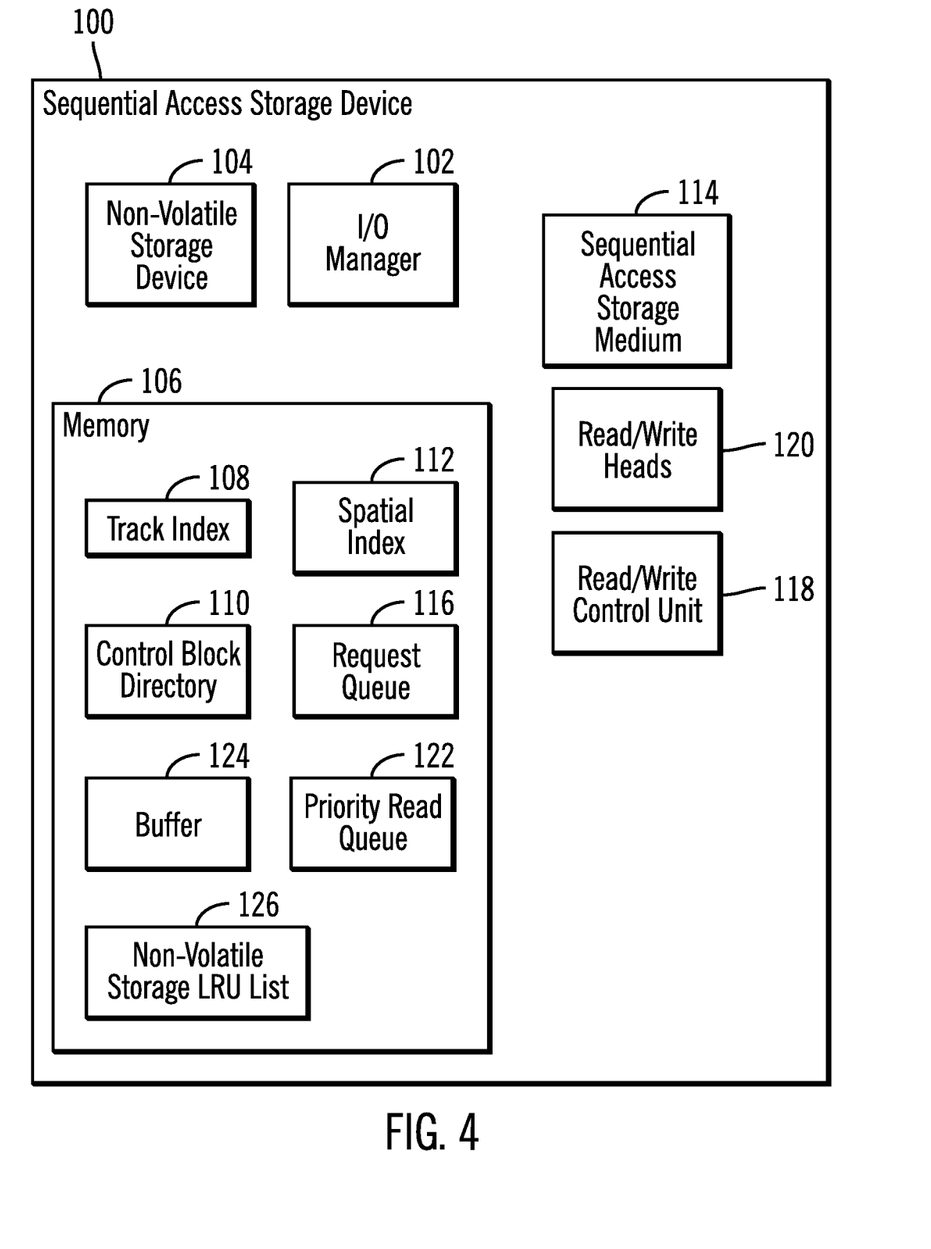
FIG. 4 illustrates an embodiment of a sequential access storage device.

FIG. 4 illustrates an embodiment of a sequential access storage device 100, where the storage 10 may be implemented with one or multiple sequential access storage devices 100. The sequential access storage device 100 includes control logic shown as the I/O manager 102, a non-volatile storage device 104 to buffer modified data, and a memory 106 including a track index 108 providing an index of tracks in the non-volatile storage device 104 to control blocks in a control block directory 110; a spatial index 112 providing a spatial ordering of the tracks (both read and write) in the non-volatile storage 104 on the physical locations in a sequential access storage medium 114 at which the tracks to read or write are stored; and a request queue 116 in which read and write requests are queued. Entries in the request queue 116 may identify the type of request, read or write, and the requested tracks, whose location on the sequential access storage medium 114 can be determined from the spatial index 112. The I/O manager 102 adds read and write request to the request queue 112, and accesses read and write requests from the request queue 112 to execute against a sequential access medium 114. The I/O manager 102 may send commands to a read/write control unit 118 that generates control signals to move one or more actuators having read/write heads 120 to a position on the sequential access storage medium 114 at which data can be read or written.

The memory 106 further includes a read priority queue 122 to buffer high priority read requests. Lower or non-high priority read requests are added to the request queue 116. The storage controller 4 may indicate the priority of read requests submitted to the sequential access storage device 100 in a header field of the read request. In certain embodiments read requests in the priority read queue 122 and the request queue 116 are read based on a temporal order, or order in which they were added to the queues 116 and 122, where the queues may comprise LRU queues. Destage requests are added to the request queue 116 based on a temporal order in which write requests are received. Modified tracks in the non-volatile storage device 104 and read requests in the request queue 116 are processed based on the spatial index 112 so when a destage or read request is processed in the request queue 116, the track to destage or read is selected using the spatial index 112 based on the current position of the read write head 120. Thus, although the read requests and destage requests are added to the request queue 116 according to a temporal order, they are processed in the request queue 116 based on their location in the sequential access storage medium 114 with respect to the read/write heads 120 to minimize the time for the read/write heads 120 to seek and the medium 114 to rotate to access the track locations to read or write.

A buffer 124 in the device 100 may temporarily buffer read and write input requests and data being returned to a read request. The buffer 124 may also be used to temporarily buffer modified tracks for write requests not maintained in the non-volatile storage device, such as for sequential write requests and their modified data. The buffer 124 may be in a separate device than the non-volatile storage device 104 and may comprise smaller storage space than available in the non-volatile storage device 104. Alternatively, some or all of the buffer 124 may be implemented in the non-volatile storage device.

A non-volatile storage (NVS) LRU list 126 provides an LRU queue for tracks buffered in the non-volatile storage device 104, including modified tracks to write to the sequential access storage medium 114 and prefetch tracks. The NVS LRU list 126 may be used to determine tracks to remove from the non-volatile storage device 104 if space needs to be freed in the non-volatile storage device 104.

The sequential access storage medium 114 may comprise one or more hard disk drive platters for a hard disk drive device or magnetic tape. In certain embodiments, the non-volatile storage device 104 may comprise a flash memory device comprised of solid state storage. In certain embodiments, the non-volatile storage device 104, e.g., flash memory, is implemented on the sequential access storage device 100 circuit board within the enclosure including the sequential access storage device 100 components. For instance, the may comprise an 8 GB flash memory device.

Some or all of the functions of the I/O manager 102 may be implemented as code executed by a processor in the sequential access storage device 100. Alternatively, some or all of the functions of the I/O manager 102 may be implemented in an ASIC on the sequential access storage device 100.

In one embodiment where the sequential access storage device 100 includes a non-volatile storage device 104, the storage controller 4 may only include a first cache 14 and not the second cache 18 because the second level cache is implemented as the non-volatile storage device 104 in the sequential access storage device 100. Further, in an embodiment where the storage controller 4 includes the first cache 14 and the second cache 18, the sequential access storage device 100 may or may not include the non-volatile storage device 104.

Figure 5:
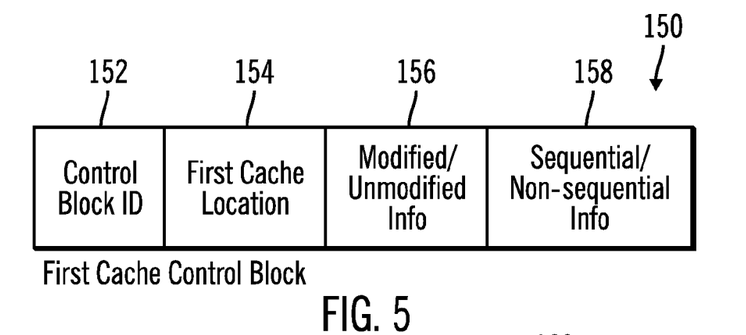
FIG. 5 illustrates an embodiment of a first cache control block.

FIG. 5 illustrates an embodiment of a first cache control block 150 entry in the control block directory 52, including a control block identifier (ID) 152, a first cache location 154 of the physical location of the track in the first cache 14, information 156 indicating whether the track is modified or unmodified, and information 158 indicating whether the track is a sequential or non-sequential access.

Figure 6:
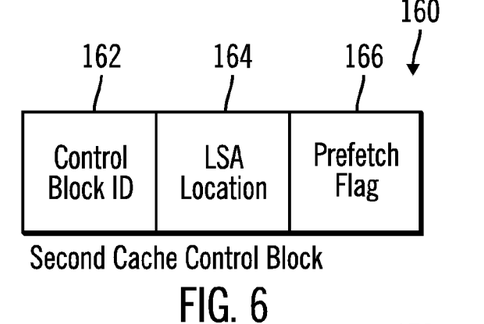
FIG. 6 illustrates an embodiment of a second cache control block.

FIG. 6 illustrates an embodiment of a second cache control block 160 entry in the second cache control block directory 72, including a control block identifier (ID) 162 and an LSA location 164 where the track is located in the LSA 32. In certain embodiments, the second cache control block 160 may further include a prefetch flag 166 indicating whether the track is for a pre-fetch operation so that the prefetch track may be maintained in the second cache 16 longer to be available for the read that will need the prefetch track. The unmodified LRU list 74 may identify unmodified non-sequential tracks demoted from the first cache 14 and promoted to the second cache 18 and pre-fetch tracks read from the storage 10 to pre-fetch for subsequent operations.

Figure 7:
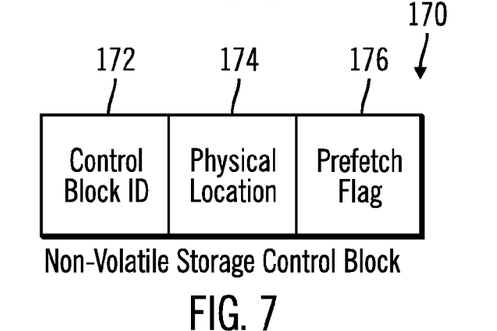
FIG. 7 illustrates an embodiment of a non-volatile storage cache control block.

FIG. 7 illustrates an embodiment of a non-volatile storage control block 170 entry in the non-volatile storage 104 control block directory 110, including a control block identifier (ID) 172 and a physical location 174 at which the track is located, such as an LSA location if the track is stored in a LSA on the non-volatile storage device. In certain embodiments, the non-volatile storage control block 170 may include a prefetch flag 176 indicating whether the track was read from the sequential access storage medium 114 and placed in the non-volatile storage device 104 as part of a prefetch operation. In certain embodiments, tracks that are read from the sequential access storage medium 114 as part of a prefetch operation may be maintained in the non-volatile storage device 104 longer before being removed to free space.

Figure 8:
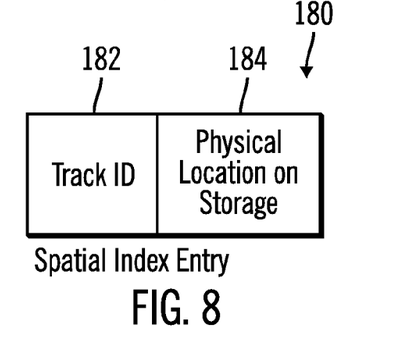
FIG. 8 illustrates an embodiment of a spatial index entry.

FIG. 8 illustrates a spatial index entry 180 including a track identifier 182 of a track in the non-volatile storage device 104 and the physical location 184 of where the track to read or write is stored in the sequential access storage medium 114, such as a cylinder, platter number, angular position on the cylinder, etc.

In an embodiment, the request queue 116 may include low priority read requests and write requests that are selected for processing based on a spatial ordering of where the data is on the sequential access storage medium. When the sequential access storage device 100 comprises a hard disk drive and the sequential access storage medium 114 comprises a magnetic disk, the spatial index 112 indicates a cylinder of the track on magnetic disk. To determine the track in the request queue 116 that can be accessed in the minimal time from the current position of the read/write head 120, the I/O manager 102 may analyze the cylinder and angular position of the tracks to read or write in the spatial index 112 to estimate the times for the read/write head 120 to seek to the cylinders of the tracks and rotate the disk under the read/write head 120 to reach the angular positions of the requested tracks. The I/O manager may then select a track in the request queue 116 having a minimal of the estimated access times.

The priority read queue 122 may include high priority read requests and the requests in the priority read queue 122 may be processed at a higher priority than requests in the request queue 116.

In a further embodiment the sequential access storage device 114 may comprise a hard disk drive having multiple disk platters and multiple write heads to write to each platter. The I/O manager 102 may determine the estimated time to seek and rotate to each modified track on each disk platter from the current position of the write heads to select a modified track having the minimal estimated time to access across the disk platters.

In an alternative embodiment, lower priority requests in the request queue 116 may be processed according to a temporal ordering, not just a spatial ordering of the requested tracks.

In addition, if the I/O manager 104 determines that a destage operation needs to be performed to destage modified tracks in the non-volatile storage device 104 to the sequential access storage medium 114 to free space in the non-volatile storage medium 104, then the destage operation may interrupt the processing of the requests in the priority read queue 122 and the request queue 116.

Figure 9:
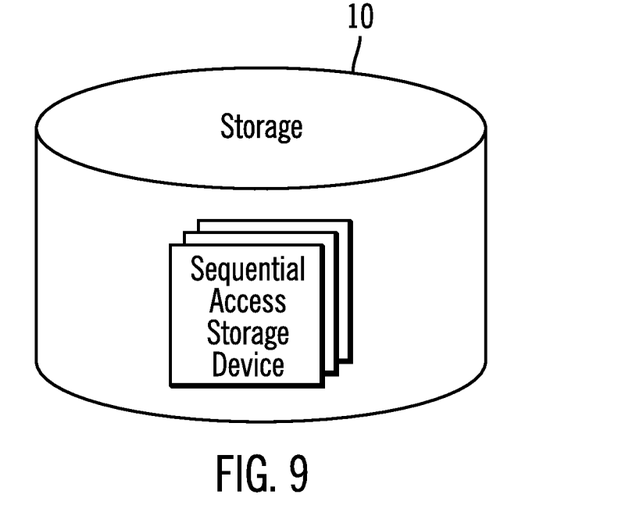
FIG. 9 illustrates an embodiment of a storage having sequential access storage devices.

FIG. 9 illustrates an embodiment of the storage 10 of FIG. 1 comprised of an array of sequential access storage devices 200, where each of the sequential access storage devices 200 may comprise sequential access storage device 100 or other sequential access storage devices. The storage manager 22 may comprise a RAID controller to stripe tracks and parity data in a stride across the sequential access storage devices 200.

Figure 10:
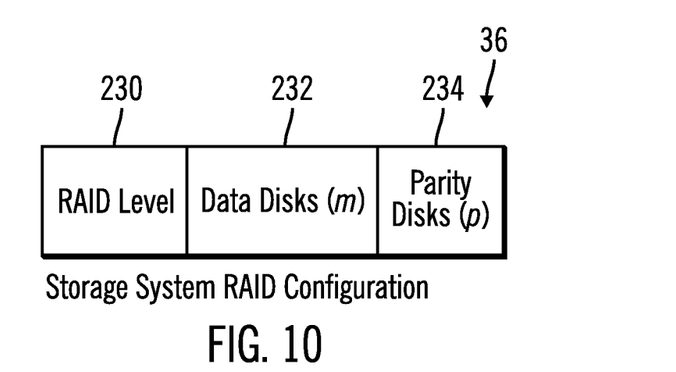
FIG. 10 illustrates an embodiment of storage system RAID configuration information.

FIG. 10 illustrates an embodiment of the storage RAID configuration 36 that is maintained to determine how to form strides of modified tracks in the first cache 14 to destage to the storage 10. A RAID level 230 indicates the RAID configuration to use, a number of data disks (m) 232 storing tracks of user data, and a number of parity disks (p) 234 storing parity calculated from the data disks 522, where p can be one or more, indicating the number of disks for storing the calculated parity blocks. The stride of tracks from the first cache 14 may be striped across disks 200 in the storage system 10. In alternative embodiments, the tracks and any parity data may be arranged in groups not limited to RAID strides, but other group types for grouping data to write across disks.

Figure 11:
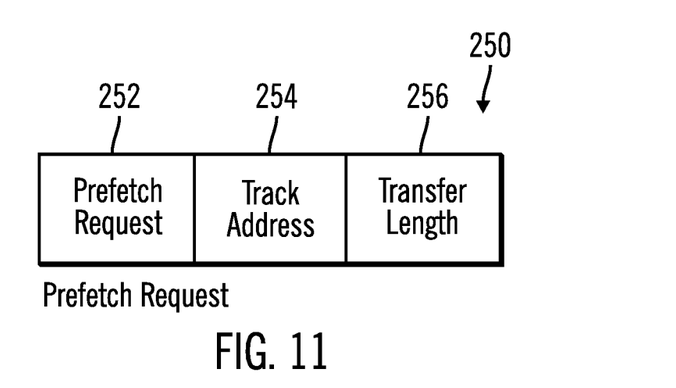
FIG. 11 illustrates an embodiment of a prefetch request.

FIG. 11 illustrates an embodiment of a prefetch request 250, including a prefetch request 252 operation code, a track address 254 indicating a starting track in the sequential access storage medium 114 at which to start prefetching, and a transfer length 726 indicating a start of the prefetch.

Figure 12:
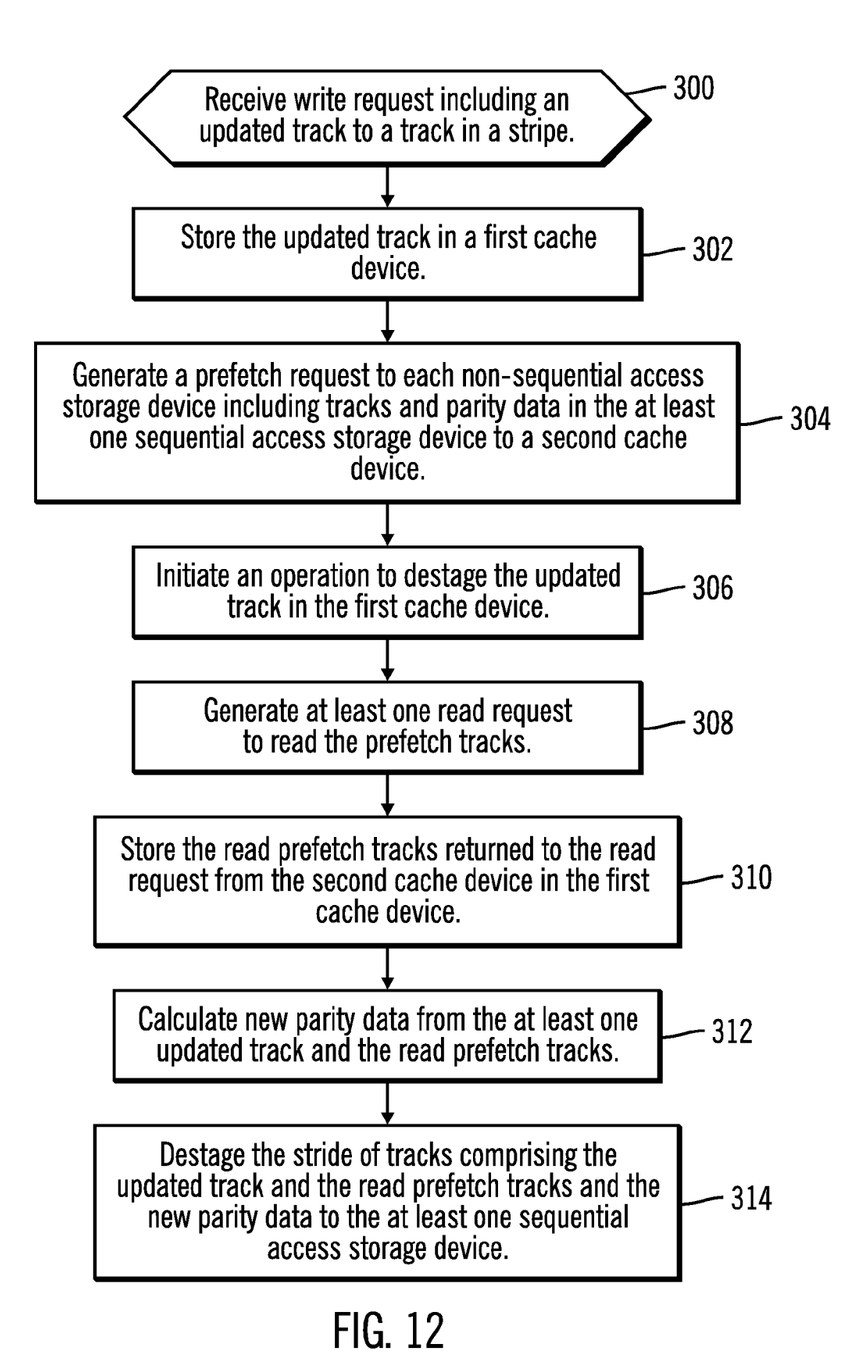
FIG. 12 illustrates an embodiment of operations to process a write request including an updated track to a group of tracks, such as a stride, and destage the updated tracks.

FIG. 12 illustrates an embodiment of operations performed by the storage manager 22 and cache manager 24 manage a write request having an updated track for a track in a stride that is striped across the sequential access storage devices 200. Upon receiving (at block 300) a write request including an updated track, the storage manager 22 may store (at block 302) the updated track in the first cache 14, or a first cache device. Because the other tracks and parity data in the stride will later be needed to destage the updated track in order to calculate the new parity for the stride, the storage manager 22 generates (at block 304) a prefetch request 250 to each non-sequential access storage device 100 including tracks and parity data in the at least one sequential access storage device to a second cache device. The prefetch tracks may comprise tracks in the stride other than the tracks updated by the write request and the parity data for the stride. In one embodiment, the second cache device may comprise the second cache 18 in the storage controller 2 or may, alternatively, comprise the non-volatile storage device 104 in the sequential access storage device 100 (FIG. 4).

The cache manager 24 may initiate (at block 306) an operation to destage the updated track in the first cache 14 in order to free space in the first cache 14. In such case, the storage manager 22 may then need to access the prefetch tracks in order to write all the tracks of the stripe, including the updated tracks, and calculate parity for the stride. To obtain the old tracks and old parity, the storage manager 22 generates (at block 308) at least one read request to read the prefetch tracks from the second cache device (second cache 18 or non-volatile storage device 104). The read prefetch tracks returned to the read request from the second cache device 18, 104 are stored (at block 310) in the first cache device 14. The storage manager 22 calculates (at block 312) new parity data from the at least one updated track and the read prefetch tracks, including parity data, and destages (at block 314) the stride of tracks comprising the updated track and the read prefetch tracks and the new parity data to the at least one sequential access storage device 200.

In one embodiment, the storage manager 22 may calculate the parity data as the tracks are being striped across the sequential access storage devices 200 according to a RAID algorithm, such as RAID 5 or some other RAID level.

Figure 13:
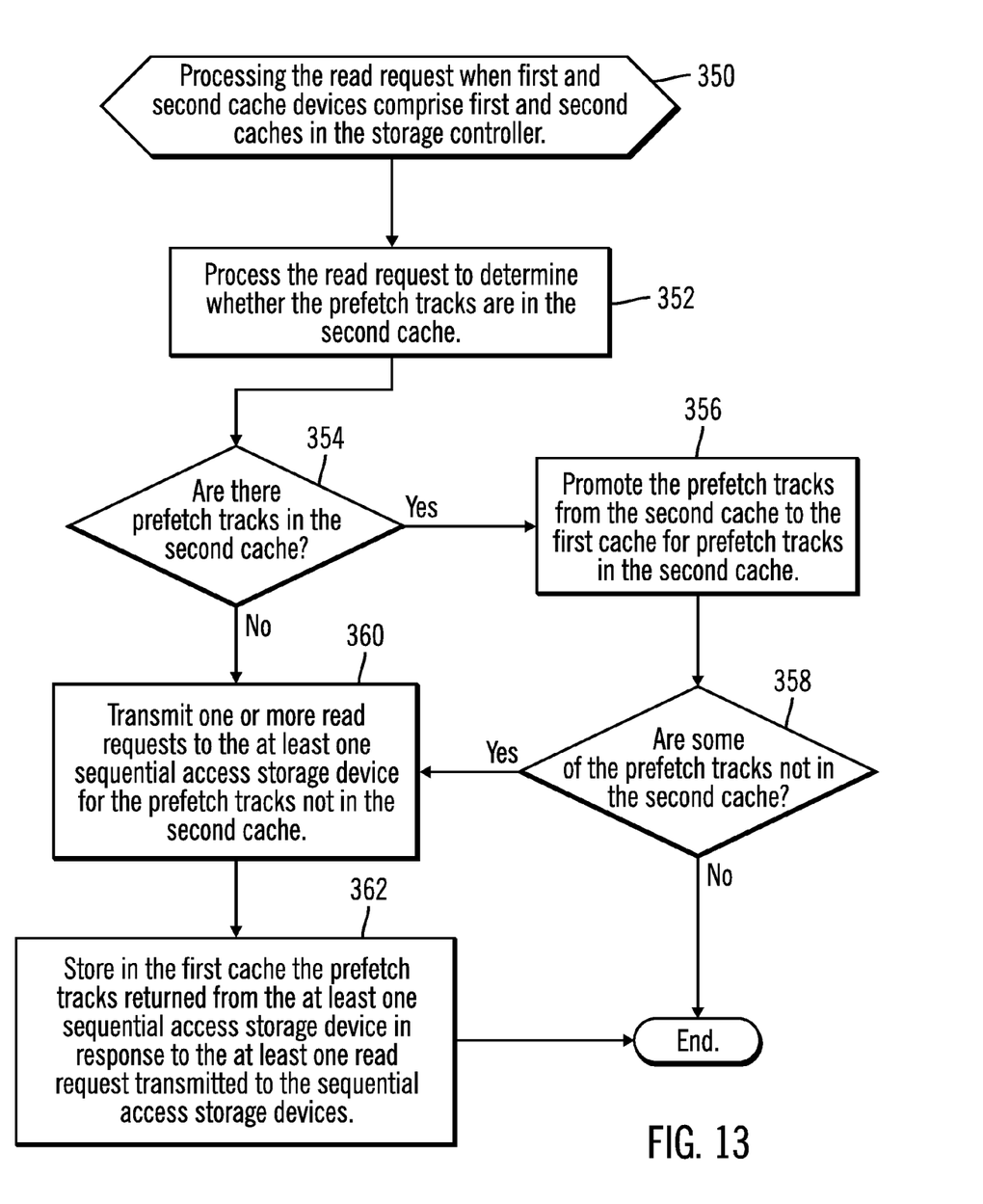
FIGS. 13 and 14 illustrate embodiments of operations to process a read request to read prefetched tracks.

FIG. 13 illustrates an embodiment of operations for the cache manager 24 to process the read request from the storage manager 22 when the first and second cache devices comprise the first cache 14 and the second cache 18 in the storage controller 4, respectively. In the embodiment of FIG. 13, the sequential access storage device 100 may or may not have a non-volatile storage device 104. Upon processing (at block 350) the read request, the cache manager 24 (or storage manager 22) determines (at block 352) whether prefetch tracks are in the second cache 18. If (at block 354) there are some or all of the prefetch tracks in the second cache 18 needed to form a full stride when combined with the updated track, then the cache manager 24 promotes (at block 356) the prefetch tracks from the second cache 18 to the first cache 14 for prefetch tracks in the second cache 18. If (at block 358) some of the prefetch tracks needed to form the stride are not in the second cache 18 or no prefetch tracks are in the second cache 18 (from the no branch of block 354), then the cache manager 24 transmits (at block 360) a read request to each sequential access storage device 200 having the prefetch tracks not in the second cache 18. The prefetch tracks returned from the sequential access storage devices 200 in response to the read requests transmitted to the sequential access storage device are stored (at block 362) in the first cache 14. In the embodiment of FIG. 13, the sequential access storage devices 200 may or may not include the non-volatile storage device 104.

Once all the tracks in the stride (or group) are in the first cache 14, including old prefetch tracks, the new updated track, and parity data, then the data may be striped across the sequential access storage devices 200 storing the tracks in the stride.

Figure 14:
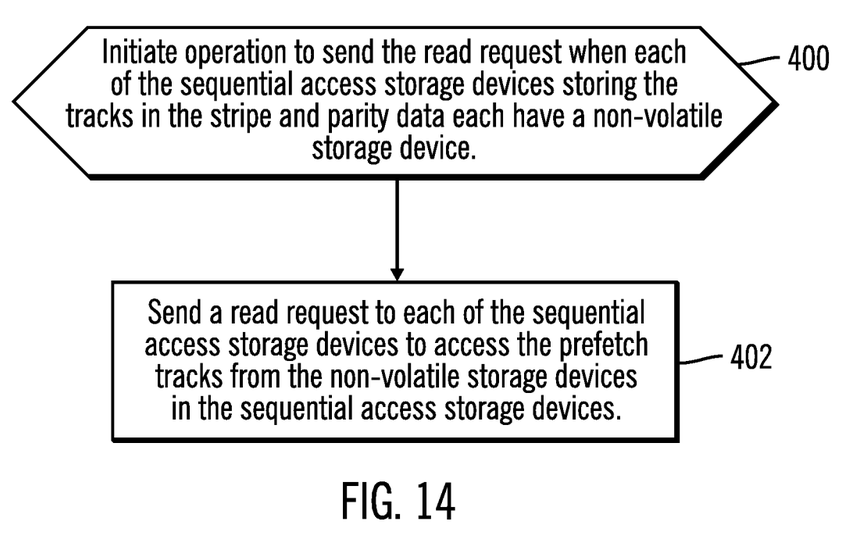

FIG. 14 illustrates an embodiment of operations to send the read request when each of the non-sequential storage devices 200 storing the tracks in the stride and the parity data include a non-volatile storage device 104 a shown in FIG. 4, where in such case there are multiple second cache devices included within the sequential access storage devices 200. In such embodiments, the prefetch tracks are stored in the non-volatile storage device 104 in each sequential access storage device 200 in response to the prefetch requests. Upon initiating (at block 400) the operation to send the read request in such embodiments, the storage manager 22 sends (at block 402) a read request to each of the sequential access storage devices 200 to access the prefetch tracks from the non-volatile storage devices 104 in the sequential access storage devices 200. In one embodiment, the read request may be designated at a high priority, such as a priority higher than the priority at which the prefetch request is submitted to the sequential access storage devices 200.

In described embodiments, the prefetch request is designated to be processed at a lower priority than the read request. The prefetch request is added to the request queue 116, where it is processed according to a spatial ordering of the read and write tracks in the request queue 116. Whereas, if the read request is to be processed against the sequential access storage medium 114, such as the case if the prefetch tracks were not in the non-volatile storage device 104, then the read request would be processed at a higher priority based on a temporal ordering of the read requests in the priority read queue 122. For instance, the storage manager 22 destaging stripes of tracks at a high priority will need the old tracks and parity data to stripe the tracks and parity data across the sequential access storage devices 200 at a later time when the updated track is ready for destage. In such case, the storage manager 22 can prefetch the old tracks and old parity at a lower priority than the high priority at which the storage manager 22 is destaging updated tracks from the first cache 14. However, when the storage manager 22 needs to destage the updated tracks, then the read request for the tracks that were prefetched is issued designating a high priority, higher than the priority at which the prefetch request was sent.

Described embodiments provide techniques for allowing the use of a second level cache device between a primary or first level cache device and a storage to store old tracks and parity data in a stride from the sequential access storage devices to make available when an updated track in the stride needs to be destaged. The described embodiments reduce read latency in reading the old data and old parity at the time of the destage because the old tracks and parity are prefetched, at a lower priority, to make available in a faster access device when needed for the destage.

Further benefits are realized by allowing priority indication of read requests so that high priority read requests and the lower priority prefetch requests will not be unduly delayed in being processed as a result of operations to destage modified tracks to the sequential access storage medium 114. In this way, high priority read requests may be processed at a higher priority than lower priority read requests, prefetch requests and destage requests to destage modified tracks for write requests cached in the non-volatile storage device 104.

Further, with the described embodiments, the lower priority read requests in the request queue 116 are processed based on a spatial ordering of the received lower priority read requests and destage requests for write requests in the request queue. High priority read and prefetch requests for old tracks and old parity are processed based on a temporal ordering of the received high priority read requests. However, modified tracks for write requests, prefetch requests, and low priority read requests are processed based on a spatial ordering of the write requests, low priority read requests, prefetch requests, and a current position of the read/write head 120 to optimize the seek and latency delays for the read and write requests.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 12-14 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing a group of data tracks and parity data in at least one sequential access storage device and communicating with a first cache device and a second cache device, the computer program product comprising a computer readable storage medium having computer readable program code embodied therein that executes to perform operations, the operations comprising:

receiving a write request including at least one updated track to the group of tracks;

storing the at least one updated track in the first cache device;

sending a prefetch request to the at least one sequential access storage device to prefetch tracks in the group of tracks to the second cache device;

generating a read request to read the prefetch tracks following the sending of the prefetch request;

storing the read prefetch tracks returned to the read request from the second cache device in the first cache device; and calculating new parity data from the at least one updated track and the read prefetch tracks.

2. The computer program product of claim 1, wherein the operations further comprise:

destaging the group of tracks comprising the updated track and the read prefetch tracks and the new parity data to the at least one sequential access storage device, wherein the read prefetch tracks include the tracks in the group other than the at least one updated track in the at least one sequential access storage device.

3. The computer program product of claim 1, wherein the prefetch request is generated in response to receiving the write request.

4. The computer program product of claim 1, wherein the prefetch request is designated to be processed in the sequential access storage device at a first priority, and wherein the read request is designated to be processed at a second priority at the sequential access storage device, wherein the first priority has a lower priority processing in the sequential access storage device than the higher priority.

5. The computer program product of claim 4, wherein the prefetch request is designated to be processed at the sequential access storage device according to a spatial ordering of physical locations at which first priority tracks are stored in the sequential access storage device, and wherein the read request is designated to be processed at the sequential access storage device according to a temporal ordering of second priority tracks at the sequential access storage device.

6. The computer program product of claim 1, wherein the first and the second cache devices are in a storage controller external to the sequential access storage device, wherein the operations further comprise:

processing the read request to determine whether the prefetch tracks are in the second cache device;

promoting the prefetch tracks from the second cache device to the first cache device in response to determining that the prefetch tracks are in the second cache device;

transmitting the read request to the at least one sequential access storage device in response to determining that the prefetch tracks are not in the second cache device; and storing the prefetch tracks returned from the sequential access storage device in response to the read request transmitted to the sequential access storage device in the first cache device.

7. The computer program product of claim 1, wherein the second cache device comprises a non-volatile storage device within the sequential access storage device and the first cache device is in a storage controller external to the sequential access storage device.

8. The computer program product of claim 1, wherein the first cache device is a faster access device than the second cache device.

9. The computer program product of claim 1, wherein the group of tracks comprises a stride of tracks and parity data written across a plurality of sequential access storage devices, wherein sending the prefetch request comprises sending a prefetch request to each of the sequential access storage devices storing the tracks in the stride and the parity data.

10. The computer program product of claim 9, wherein the operations further comprise:

destaging the stride of tracks including the updated track and the read prefetch tracks and the new parity data to the sequential access storage devices storing the stripe of tracks and the parity data.

11. The computer program product of claim 9, wherein each of the sequential access storage devices include a second cache device to store the prefetch tracks in the stride, and wherein generating the read request comprises sending a read request to each of the sequential access storage devices to access the prefetch tracks from the second cache devices in the sequential access storage devices.

12. A system for processing a group of data tracks and parity data in at least one sequential access storage device and in communication with a second cache device, comprising:
a processor;
a first cache device; and
a computer readable storage medium having computer readable program code embodied therein executed by the processor to perform operations, the operations comprising:
receiving a write request including at least one updated track to the group of tracks;
storing the at least one updated track in the first cache device;
sending a prefetch request to the at least one sequential access storage device to prefetch tracks in the group of tracks to the second cache device;
generating a read request to read the prefetch tracks following the sending of the prefetch request;
storing the read prefetch tracks returned to the read request from the second cache device in the first cache device; and
calculating new parity data from the at least one updated track and the read prefetch tracks.

13. The system of claim 12, wherein the operations further comprise:
destaging the group of tracks comprising the updated track and the read prefetch tracks and the new parity data to the at least one sequential access storage device, wherein the read prefetch tracks include the tracks in the group other than the at least one updated track in the at least one sequential access storage device.

14. The system of claim 12, wherein the prefetch request is generated in response to receiving the write request.

15. The system of claim 12, wherein the prefetch request is designated to be processed in the sequential access storage device at a first priority, and wherein the read request is designated to be processed at a second priority at the sequential access storage device, wherein the first priority has a lower priority processing in the sequential access storage device than the higher priority.

16. The system of claim 15, wherein the prefetch request is designated to be processed at the sequential access storage device according to a spatial ordering of physical locations at which first priority tracks are stored in the sequential access storage device, and wherein the read request is designated to be processed at the sequential access storage device according to a temporal ordering of second priority tracks at the sequential access storage device.

17. The system of claim 12, wherein the second cache device is within the system and external to the at least one sequential access storage device, wherein the operations further comprise:
processing the read request to determine whether the prefetch tracks are in the second cache device;
promoting the prefetch tracks from the second cache device to the first cache device in response to determining that the prefetch tracks are in the second cache device;
transmitting the read request to the at least one sequential access storage device in response to determining that the prefetch tracks are not in the second cache device; and
storing the prefetch tracks returned from the sequential access storage device in response to the read request transmitted to the sequential access storage device in the first cache device.

18. The system of claim 12, wherein the second cache device is within the sequential access storage device.

19. A system, comprising:
a storage having a plurality of sequential access storage devices, wherein strides of tracks and parity data are striped across the sequential access storage devices, wherein the sequential access storage devices each have a non-volatile storage device;
a storage controller in communication with the storage, comprising:
a processor;
a cache device;
a computer readable storage medium having computer readable program code embodied therein executed by the processor to perform operations, the operations comprising:
receiving a write request including at least one updated track to a requested stride tracks;
storing the at least one updated track in the cache device;
sending prefetch requests to at least one of the sequential access storage devices to prefetch tracks in the requested stride to the non-volatile storage device in each of the sequential access storage devices to which the prefetch requests were sent;
generating a read request for each of the sequential access storage devices to which the prefetch request was sent to read the prefetch tracks following the sending of the prefetch request;
storing the read prefetch tracks returned to the read requests from the non-volatile storage devices in the cache device; and
calculating new parity data from the at least one updated track and the read prefetch tracks.

20. The system of claim 19, wherein the operations further comprise:
destaging the group of tracks comprising the updated track and the read prefetch tracks and the new parity data to the at least one sequential access storage device, wherein the read prefetch tracks include the tracks in the group other than the at least one updated track in the at least one sequential access storage device.

21. The system of claim 19, wherein the prefetch request is generated in response to receiving the write request.

22. The system of claim 19, wherein the prefetch request is designated to be processed in the sequential access storage device at a first priority, and wherein the read request is designated to be processed at a second priority at the sequential access storage device, wherein the first priority has a lower priority processing in the sequential access storage device than the higher priority.

23. The system of claim 22, wherein the prefetch request is designated to be processed at the sequential access storage device according to a spatial ordering of physical locations at which first priority tracks are stored in the sequential access storage device, and wherein the read request is designated to be processed at the sequential access storage device according to a temporal ordering of second priority tracks at the sequential access storage device.

24. The system of claim 19, wherein the non-volatile storage device and the cache are in a storage controller external to the sequential access storage device, wherein the operations further comprise:
   processing the read request to determine whether the prefetch tracks are in the non-volatile storage device;
   promoting the prefetch tracks from the non-volatile storage device to the cache device in response to determining that the prefetch tracks are in the cache device;
   transmitting the read request to the at least one sequential access storage device in response to determining that the prefetch tracks are not in the non-volatile storage device and
   storing the prefetch tracks returned from the sequential access storage device in response to the read request transmitted to the sequential access storage device in the first cache device.

25. The system of claim 19, wherein the non-volatile storage device is within the sequential access storage device.

26. The system of claim 19, wherein the cache device is a faster access device than the non-volatile storage device.

27. The system of claim 19, wherein the operations further comprise:
   destaging the stride of tracks including the updated track and the read prefetch tracks and the new parity data to the sequential access storage devices storing the stripe of tracks and the parity data.

28. The system of claim 19, wherein each of the sequential access storage devices include a second cache device to store the prefetch tracks in the stride, and wherein generating the read request comprises sending a read request to each of the sequential access storage devices to access the prefetch tracks from the second cache devices in the sequential access storage devices.

* * * * *